Dec. 29, 1970  F. F. MILLER, JR  3,550,396

CONSTANT VELOCITY UNIVERSAL JOINT

Filed Dec. 6, 1968

INVENTOR.
FRED F. MILLER, JR.

BY

ATTORNEY

United States Patent Office 3,550,396
Patented Dec. 29, 1970

3,550,396
CONSTANT VELOCITY UNIVERSAL JOINT
Fred F. Miller, Jr., Troy, Mich., assignor to Dana Corporation, Toledo, Ohio, a corporation of Virginia
Filed Dec. 6, 1968, Ser. No. 781,786
Int. Cl. F16d 3/30
U.S. Cl. 64—21   9 Claims

ABSTRACT OF THE DISCLOSURE

A cageless telescoping constant velocity universal joint having inner and outer members with drive balls disposed therebetween. The inner member and the opening in the outer member are elongated when viewed in transverse cross-section with the shorter sides of the inner member each slidingly engaging the adjacent inner wall of the opening in the outer member for relative angular and axial movement. Paired ball receiving grooves are formed in the longer sides of the inner member and the adjacent inner walls of the outer member and each pair of grooves has a drive ball therein.

---

This invention relates to constant velocity universal joints generally and more particularly to ball type constant velocity universal joints which do not require a cage for positioning the drive balls.

It is well known in the prior art that in order to obtain constant velocity torque transmission by a ball type constant velocity joint, it is of significant importance that the drive balls form and are maintained in a uniplanar relationship and further that this plane will substantially bisect any operative angle assumed by the respective axes of the joint members during joint operations. Maintaining this uniplanar relationship has been a difficult problem as uniplanar relationship between the drive balls. One apjoint operations produce forces on the drive balls tending to disrupt this uniplanar relationship.

Various structures and devices have been used in the prior art in order to ensure maintenance of the required uniplanar relationship between the drive balls. One approach has been the use of an annular ball cage member disposed between the inner and outer universal joint members which receives and generally serves to hold the intermediate drive balls in the desired uniplanar relationship. The problem with the use of this type of device has been the added cost of manufacture incurred therewith, and the fact that the cage, having to assimilate large thrust and frictional loads while being limited in size, is a source of failure. Additionally, these cage members have a tendency to reduce joint flexibility because of their relative size and position relationship.

A prior art method of maintaining the drive balls of a cageless constant velocity universal joint in a single plane has been through the use of certain relatively complex groove constructions on both the inner and outer joint members. One such universal joint, as seen in U.S. Pat. 3,002,364, has cooperating longitudinally extending grooves on the inner and outer universal joint members which are positioned at a mutually opposing angular relationship in the circumferential sense and also inclined oppositely in a radial direction, thereby giving these groove axes transverse, axial and radial components. By these constructional features, the drive balls can be held in spaces formed by the intersecting opposing grooves, and are thereby restrained in the desired uniplanar relationship without the need of using an annular ball cage member for this function. However, the disadvantage in these complex groove constructions is the relatively high cost of manufacture involved therewith and the feature that the drive balls are loaded with shear type forces such that, were the drive balls of other than spherical configuration they would be loaded in shear when torque is transmitted from one joint member to the other, rather than in compression, and these shear type forces result in a greater stress on the individual drive balls.

Another type of cageless constant velocity universal joint is exemplified by U.S. Pat. 3,184,927, wherein the means for preventing relative movement of the joint members in one transverse direction is a piloting means which must be limited in size so as not to interfere with the grooves in the members, and must be manufactured separately.

Thus, it is an object of this invention to provide a ball type constant velocity universal joint which eliminates both the need for an annular ball cage member and the need for complex groove arrangements on the joint members, while being based on joint member elements which are of relatively simple construction.

Another object of this invention is to provide such a universal joint which can accommodate substantial relative axial movement of the joint members.

Yet another object is to provide a constant velocity universal joint which allows the drive balls to be subjected to compression rather than shear type forces, thereby reducing the deformative forces on the drive balls with the consequent result of prolonging universal joint life and effectiveness.

A further object of this invention is to reduce the cost of manufacture for ball type constant velocity universal joints, in arriving at a joint which is also relatively more economical and efficient in operation.

Yet another object of this invention is to provide a relatively simple construction for a ball type constant velocity universal joint, in which the grooves on the individual joint members may be machined simultaneously.

Still another object of this invention is to provide a constant velocity universal joint which includes strong and positive piloting between the joint members.

Other and further objects of this invention will become apparent from the following description when taken in conjunction with the following drawings wherein.

Figure 1:
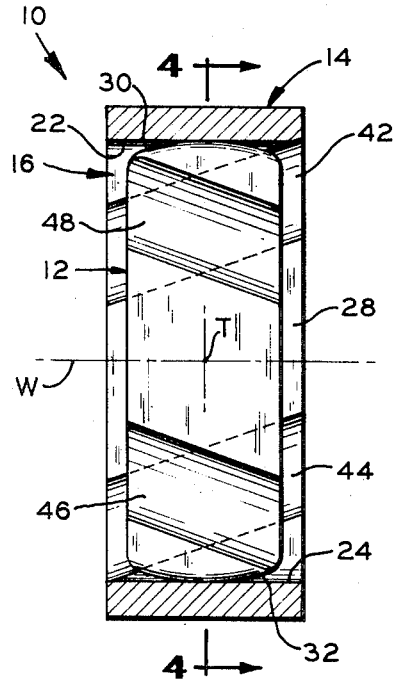
FIG. 1 is a side view of a ball type constant velocity joint in which the outer member is shown in longitudinal section and the inner member is shown in full, and which joint embodies the inventive concept herein.
Figure 2:
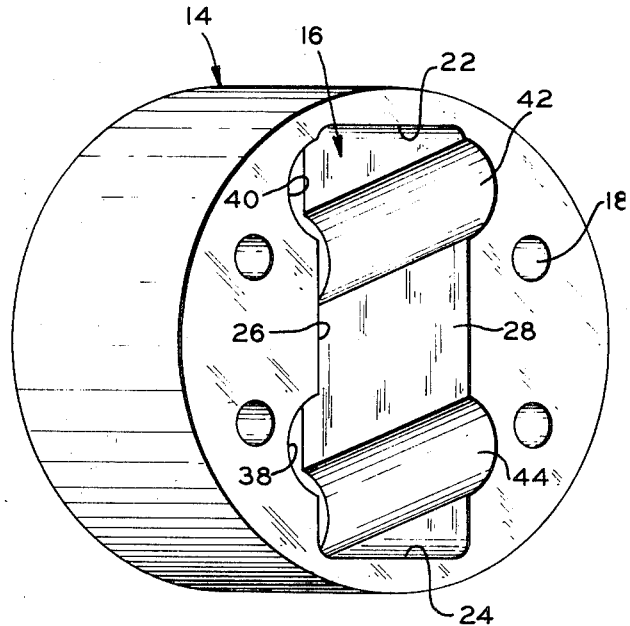
FIG. 2 is a perspective view from the right end of the outer joint member of the embodiment in FIG. 1.
Figure 3:
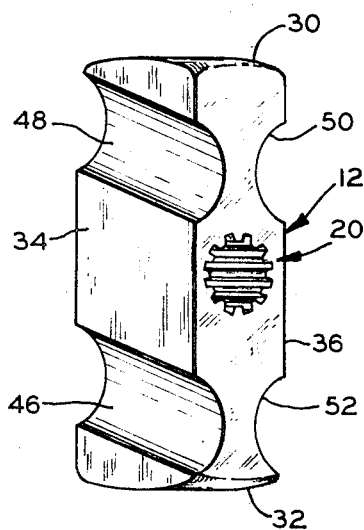
FIG. 3 is a perspective view from the right end of the inner joint member shown in the embodiment of FIG. 1.

In a preferred embodiment of the subject invention, a ball type constant velocity universal joint includes inner and outer joint members which are capable of telescoping relative to one another. The inner member and the opening in the outer member which receives the inner member are elongated when viewed in transverse cross-section. The shorter sides of the inner member each slidingly engages the adjacent inner wall of the opening in the outer member for relative angular and axial movement.

The longer sides of the inner member are spaced from the adjacent longer walls of the outer member, and the longer sides and longer walls each have a pair of grooves formed therein, with each groove in the inner member being disposed in a cooperating opposite relationship with a groove in the outer member. A torque transferring drive ball is disposed in each pair of grooves for drivingly connecting the inner and outer members.

Referring now to the drawings, a universal joint shown generally at 10 includes inner and outer joint members 12 and 14; the outer member having a longitudinal opening 16 extending therethrough and receiving the inner member therein. The outer member 14 is adapted to be suitably secured to a driving or driven member as by a plurality of bolts (not shown) engaged in openings 18 in the outer member, while the inner member 12 is provided with a splined bore 20 for suitable splined connection to a driving or driven member.

Figure 4:
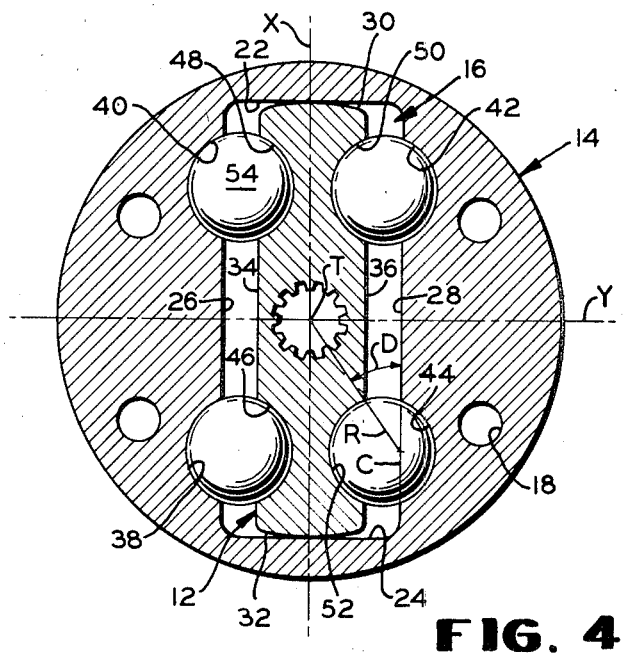
FIG. 4 is a cross-sectional view of the joint taken along the line 4—4 in FIG. 1.

As seen in FIGS. 1 and 4, the members 12 and 14, when disposed in an aligned relationship, have a coaxial longitudinal axis W and also a pair of transverse axes in the form of a major axis X and a minor axis Y; the major axis being shown in vertical position and the minor axis being shown in a horizontal position. The major and minor axes X and Y are perpendicular to each other and to the longitudinal axis W and intersect at a common point T which lies on the longitudinal axes.

The inner member 12 and the opening 16 in the outer member 14 are elongated in the direction of the major axis X. More particularly, the opening 16 is bounded by a pair of opposed first or end walls 22 and 24, which walls are intersected by the major axis X and are more widely spaced than an opposed pair of second or side walls 26 and 28 which bound the opening and are intersected by the minor axis Y and interconnect the end walls 22 and 24. The inner member has a pair of opposed first or end surfaces 30 and 32 which are intersected by the major axis X and are more widely spaced than a pair of opposed second or side surfaces 34 and 36 of the inner member which are intersected by the minor axis and interconnect the end surfaces 30 and 32.

Piloting means are provided for preventing relative movement of the inner and outer members 12 and 14 in the direction of the major axis X while allowing the inner and outer members to move angularly and axially relative to each other and includes the surfaces 30 and 32 and the walls 22 and 24. More particularly, in the longitudinal direction, as clearly seen in FIG. 1, the end walls 22 and 24 of the outer member 14 are axially straight and parallel while the end surfaces 30 and 32 of the inner member 12 are formed arcuately with the arc center being at the point T. The surfaces 30 and 32 are in sliding engagement with the walls 22 and 24 respectively. Thus, during relative pivotal movement of the members 12 and 14 about the Y axis, the surfaces 30 and 32 slidingly engage the walls 22 and 24 and the inner member may pivot about the point T. Alternatively, the walls 22 and 24 may be made arcuately in the longitudinal direction from the point T and constructed to conform to the walls 22 and 24 so that the members 12 and 14 may pivot relatively but are limited from relative axial movement.

The members 12 and 14 are also adapted for relative pivotal movement about the X axis by a suitable configuration in transverse section of the end walls 22 and 24 and the end surfaces 30 and 32 and, further, by the fact that the surfaces 34 and 36 of the inner member 12 are spaced from the walls 26 and 28 of the outer member 14. While other transverse configurations of the inner and outer member would provide for relative pivotal movement about the major axis X, in the preferred embodiment, the walls 22, 24, 26 and 28 and the surfaces 34 and 36 are formed as flat planar surfaces and the surfaces 30 and 32, as clearly seen in transverse section in FIG. 4, are formed transversely arcuately with the arc center being at the point T, so that the surfaces 30 and 32 are actually portions of a sphere.

The side wall 26 is provided with a pair of longitudinally extending semi-cylindrical grooves 38 and 40 while the side wall 28 is provided with a like pair of longitudinally extending grooves 42 and 44, which grooves have axes that are all disposed in a non-parallel relationship with the longitudinal axis W of the outer member. More particularly, the side walls 26 and 28, in this preferred embodiment, are generally flat planar surfaces which are formed in planes which lie parallel to the vertical-longitudinal plane passing through the X and W axes. The grooves 38, 40, 42 and 44 are semi-cylindrical and are formed with straight axes with the axes being parallel to each other while being disposed in an angular relationship with respect to the horizontal-longitudinal plane passing through the W and Y axes and in a parallel relationship with respect to the plane passing through the W and X axes. Accordingly, the grooves 38, 40, 42 and 44 can be broached simultaneously.

The side surfaces 34 and 36 of the inner member 12 are provided with grooves 46, 48, 50 and 52, with the grooves 38 and 46, the grooves 40 and 48, the grooves 42 and 50, and the grooves 44 and 52 being disposed in a paired, opposite and intersecting relationship. Disposed in each pair of grooves 38, 46; 40, 48; 42, 50; and 44, 52 is a torque transferring means in the form of a drive ball 54, which is disposed and maintained in the space provided by the intersection of the grooves. Since the pair of grooves intersect, the drive balls 54 cannot move longitudinally in such grooves absent relative movement of the inner and outer members 12 and 14. During relative angular and axial movement of the inner and outer members 12 and 14, the intersecting position of the grooves will always maintain the drive balls in an uniplanar relationship and in the bisecting plane in a manner well known in the art.

The axis of none of the grooves 38, 40, 42 and 44 in the outer member and the grooves 46, 48, 50 and 52 in the inner member cross the horizontal-longitudinal plane passing through WY axes throughout the entire length of such grooves. Accordingly, as seen in FIG. 4, an imaginary cord C drawn at any position along the longitudinal length of the groove 44, joining opposed edges of the groove and lying in a plane perpendicular to the longitudinal axis W will define an acute interior angle D with a radial line R extending perpendicularly from the longitudinal axis W and intersecting the cord at the midpoint thereof. The relationship between the cord C, the longitudinal axis W and the line R and the groove 44 also holds true with respect to the grooves 38, 40, 42, 46, 48, 50 and 52. If the shape of the side walls 26 and 28 and side surfaces 34 and 36 is varied from that shown, the above described cordal relationship of the grooves and longitudinal axis W and the line R connecting the same should be maintained.

Having described a preferred embodiment of this invention, what is claimed is:

1. A constant velocity universal joint comprising an outer member having a longitudinally extending opening circumferentially defined by an inner wall of said outer member, said opening being transversely elongated in a first direction, an inner member disposed in said opening and having a circumferentially extending peripheral surface and being transversely elongated in said first direction, first portions of said peripheral surface at the opposed ends of said inner member which are transversely opposed in said first direction being in sliding engagement with first wall portions of said outer member which are transversely opposed in said first direction for relative pivotal movement, the transversely opposed second portions of said peripheral surface of said inner member which lie circumferentially intermediate said opposed first portions thereof and the transversely opposed second portions of said inner wall which are circumferentially intermediate the opposed first portions thereof being spaced from each other and each having a plurality of longitudinally extending grooves therein with the axis of each of said grooves being disposed in a non-parallel relationship with respect to the longitudinal axis of the member containing the same, each groove in said inner member being paired with a groove in said outer member and in an opposite relationship therewith, and a torque transmitting means disposed in each pair of said grooves.

2. A constant velocity universal joint according to claim 1 wherein, when viewed in longitudinal cross-section, said first wall portions of said outer member are longitudinally straight and said first surface portions of said inner member are formed longitudinally arcuately from a common center.

3. A constant velocity universal joint according to claim 2 wherein each of said second wall portions are substantially parallel to the adjacent of said second surface portions.

4. A constant velocity universal joint according to claim 1 wherein a circumferentially extending cord across the opening of any of said grooves at any longitudinal position therealong defines an acute interior angle with a radial line extending perpendicularly from the longitudinal axis of the member containing the groove and intersecting said cord at the midpoint thereof.

5. A constant velocity universal joint according to claim 4 wherein each of said members has a major axis extending in said first transverse direction, a minor axis extending in a transverse direction and perpendicular to said major axis, with said major and minor axes intersecting on the longitudinal axis of said member, the axis of said grooves in each of said members are mutually parallel, and the axis of each of said grooves are parallel to the plane extending through the major and longitudinal axis and disposed angularly with respect to a plane passing through the minor and longitudinal axis.

6. A constant velocity universal joint comprising an outer member having a longitudinally extending opening circumferentially defined by an inner wall of said outer member, an inner member disposed in said opening and having a circumferentially extending peripheral surface and spaced first portions of said surface slidingly engaging spaced first portions of said internal wall for relative angular movement of said inner and outer members, and a plurality of longitudinally extending grooves in each said inner and outer member, some of said grooves being formed in second portions of said internal wall which lie circumferentially intermediate said first portions of said inner wall and others of said grooves being formed in second portions of said peripheral surface which are circumferentially intermediate the first portions of said peripheral surface, each of said grooves in said outer member being disposed in a paired opposite relationship with a groove in said inner member, and a torque transmitting means disposed in each pair of said grooves, the axis of each of said grooves being disposed in a nonparallel relationship with the longitudinal axis of the member containing the same and a transversely extending cord across the opening of any of said grooves at any longitudinal position therealong forming an acute angle with a line extending perpendicularly from the longitudinal axis of the member containing the same and intersecting said cord at the midpoint thereof.

7. A constant velocity universal joint according to claim 6 wherein said opening is transversely elongated with the first portions of said inner wall being more widely spaced than the second portions of said wall which lie circumferentially intermediate said first portions, said inner member is transversely elongated such that said first portions of said peripheral surface are more widely spaced than the second portions of said peripheral surface circumferentially intermediate said first portions.

8. A constant velocity universal joint according to claim 7 wherein, when viewed in longitudinal cross-section, said first wall portions of said outer member are longitudinally straight and said first surface portions of said inner member are formed longitudinally arcuately from a common center.

9. A constant velocity universal joint according to claim 8 wherein each of said second wall portions are radially spaced from and substantially parallel to the adjacent of said second surface portions.

References Cited
UNITED STATES PATENTS

| | | | |
|---|---|---|---|
| 3,002,364 | 10/1961 | Bellomo | 64—21 |
| 3,067,595 | 12/1962 | Faure | 64—8 |
| 3,184,927 | 5/1965 | Bellomo | 64—21 |
| 3,237,429 | 3/1966 | Biabaud | 64—8 |
| 3,296,834 | 1/1967 | Grauel | 64—21 |
| 3,296,835 | 1/1967 | Seidermann | 64—21 |

JAMES A. WONG, Primary Examiner